United States Patent [19]

Heraud et al.

[11] Patent Number: 5,290,491
[45] Date of Patent: Mar. 1, 1994

[54] PROCESS FOR THE MANUFACTURE OF A THERMOSTRUCTURAL COMPOSITE MATERIAL HAVING A CARBON INTERPHASE BETWEEN ITS REINFORCEMENT FIBERS AND ITS MATRIX

[75] Inventors: Louis Heraud, Bordeaux; Jean-Philippe Rocher, Saint Medard en Jalles, both of France

[73] Assignee: Societe Europeenne de Propulsion, Suresnes, France

[21] Appl. No.: 1,206

[22] Filed: Jan. 6, 1993

Related U.S. Application Data

[63] Continuation of Ser. No. 675,645, Mar. 27, 1991, abandoned.

[30] Foreign Application Priority Data

Apr. 2, 1990 [FR] France ............... 90 04198

[51] Int. Cl.$^5$ ........................... C23C 16/02
[52] U.S. Cl. ................... 264/29.4; 264/29.5; 264/29.6; 264/65; 423/447.4
[58] Field of Search .............. 264/29.2, 29.4, 29.5, 264/65, 29.6; 423/447.4

[56] References Cited

U.S. PATENT DOCUMENTS

| | | | |
|---|---|---|---|
| 3,895,084 | 7/1975 | Bauer | 264/29.4 |
| 4,597,923 | 7/1986 | Kennedy | 264/29.4 |
| 4,699,896 | 10/1987 | Sing et al. | 264/29.4 |
| 4,752,036 | 6/1988 | Thebault | 427/248 |
| 4,837,230 | 6/1989 | Chen et al. | 264/65 |
| 4,994,216 | 2/1991 | Hintzen et al. | 264/29.4 |
| 5,039,635 | 8/1991 | Stempin et al. | 427/220 |

FOREIGN PATENT DOCUMENTS

| | | |
|---|---|---|
| 0121797 | 3/1984 | European Pat. Off. . |
| 0127491 | 4/1984 | European Pat. Off. . |
| 0172082 | 7/1985 | European Pat. Off. . |
| 2602505 | 7/1987 | France . |
| 2640258 | 5/1988 | France . |
| 8002818 | 12/1980 | PCT Int'l Appl. . |

OTHER PUBLICATIONS

Chemical Abstracts, vol. 106, No. 8, Feb. 1987, Ref. 54837d, Nakano, et al, "Silicon Carbide Fibre-reinforced Carbon Composites", p. 298.
6045 Ceramic Engineering and Science Proceedings, vol. 9, No. 7–8, Jun. 1988, R. A. Lowden, et al.

*Primary Examiner*—Jan H. Silbaugh
*Assistant Examiner*—Mathieu Vargot
*Attorney, Agent, or Firm*—Weingarten, Schurgin, Gagnebin & Hayes

[57] ABSTRACT

The thermostructural composite material is produced by forming a fibrous preform made from refractory fibers coated with a sizing agent. The preform is densified by a refractory matrix, in particular ceramic, while a carbon interphase is provided between the fibers and the matrix. The fibrous preform is made from refractory fibers coated with a sizing agent of the type that leaves behind a carbon residue upon thermal decomposition. The carbon interphase is produced by the thermal degradation of the sizing agent, occurring for example after the preform is made. The sizing agent is chosen among phenolic, acrylic and cellulose resins, and in particular carboxymethylcellulose.

14 Claims, 1 Drawing Sheet

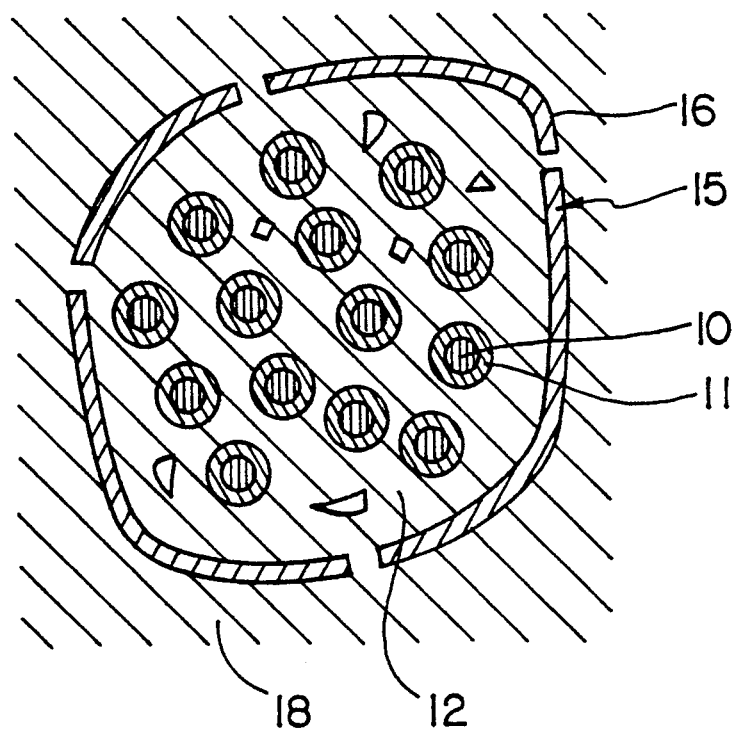

PROCESS FOR THE MANUFACTURE OF A THERMOSTRUCTURAL COMPOSITE MATERIAL HAVING A CARBON INTERPHASE BETWEEN ITS REINFORCEMENT FIBERS AND ITS MATRIX

This application is a continuation of application Ser. No. 07/675,645, filed Mar. 27, 1991, now abandoned.

BACKGROUND OF THE INVENTION

1. Field of the Invention

The present invention relates to a process for the manufacture of a thermostructural composite material, involving the steps of making a fibrous preform from refractory fibers, and densifying the preform with a refractory matrix while providing a carbon interphase between the fibers and the matrix.

A thermostructural composite material consists of a fibrous preform and a matrix which, together provide high mechanical characteristics that can be maintained at elevated temperatures.

The process according to the invention can be applied to any type of fibrous preform. The latter can be made by packing short fibers, e.g. to provide a felt, or by winding fibers. The texture can also comprise a superposition or winding of one-dimensional (1D) plies or two-dimensional (2D) plies made from strands, cables or threads, each consisting of an assembly of fibers. It is also possible to use three-dimensional (3D) preforms, such as those obtained by needling superimposed or wound plies, or by three-dimensional weaving.

Refractory fibers forming the preform are chosen among those fibers that can withstand a temperature of at least 800° C. in an atmosphere that is non-reactive for the fiber, without modification or fundamental deterioration. Examples of such fibers include carbon fibers and ceramic fibers (silicon carbide, alumina, zirconia or the like).

As to the refractory material forming the matrix, any refractory ceramic composition of the oxide, carbide, boride, nitride type or the like, as well as carbon, may be used.

The invention is more particularly aimed at composite materials having a ceramic or part-ceramic matrix, known as CMCs. These materials are employed in applications that require high-mechanical properties, such as in the manufacture of engine or jet components, or structural parts of space vehicles exposed to substantial heating effects.

In a CMC, the matrix in itself has a low breaking strain and tensile strength, a high susceptiblity to kirving, owing to its ceramic nature. In order to obtain a material that is resistant to shocks and crack propagation, the fiber-to-matrix link must be made weak, so that any crack arriving at the fiber-matrix interphase cannot continue across the fiber and cause the latter to break.

On the other hand, it is known that if high mechanical properties are to be obtained, and in particular a high resistance to flexing, then the bond between the fibers and the matrix must be rather high, in order to ensure that forces are transmitted to the fibers of the reinforcement.

2. Prior Art

A good compromise between these seemingly conflicting requirements has been found by interposing an intermediate coating, or interphase, between the fibers and the matrix. Such an interphase has a small thickness and a shear resistance which is lower than that of the matrix. Accordingly, when a crack in the matrix reaches the region of the fiber, the strains at the bottom of the crack will be released by the interphase. This interphase may e.g. be formed from a material having a laminar structure, such as laminar pyrolytic carbon or boron nitride, as described in U.S. Pat. No. 4,752,503.

According to the method taught in that document, the interphase is deposited on the fibers by chemical vapor deposition within the preform, before depositing in the matrix. This makes it necessary to carry out at least one operation between the steps of making the preform and forming the matrix. It will be noted that such operations involving chemical vapor deposition are generally long and require complex installations.

SUMMARY OF THE INVENTION WITH OBJECTS

It is an aim of the present invention to provide a process whereby the interphase between the fibers and the matrix can be produced more simply and rapidly, so reducing the time during which the chemical vapor deposition installations are used, and thus reducing the manufacturing cost of the composite materials without significantly affecting their mechanical and thermal properties.

According to the invention, these aims are achieved by making the fibrous preform from refractory fibers coated with a sizing agent of a type that leaves behind a carbon residue upon thermal decomposition, whereby the carbon interphase is provided by thermal decomposition of the sizing agent.

The carbon interphase results from a thermal treatment carried out after making the preform. The treatment is conducted under an inert atmosphere and at a sufficiently high temperature (in general greater than 300° C.) to cause pyrolysis of the sizing agent. This temperature should not, of course, exceed the limit beyond which the fibers can be damaged.

Advantageously, when the matrix is at least partly formed by a chemical vapor deposition operation conducted in an enclosure containing the preform, the thermal treatment of the sizing agent is achieved during the temperature rise within the enclosure necessary for the chemical vapor deposition of the matrix material.

The matrix can also be at least partially formed by liquid impregnation of the preform, by means of a matrix precursor, and can subsequently undergo a thermal treatment to yield a ceramic material constituting the matrix, by a transformation of the precursor. In this case, the preform is advantageously made from fibers coated with the sizing agent and impregnated with the matrix precursor prior to the heat treatment, the latter thereby producing both the carbon interphase, by thermal decomposition of the sizing agent, and the ceramic material constituting the matrix, by transformation of the precursor.

Thus, irrespective of whether the matrix is formed by a gaseous or liquid process, the carbon interphase can be created advantageously during the matrix-forming process, without calling upon additional operations.

The process according to the invention requires the use of fibers coated with a sizing agent susceptible of leaving behind a carbon residue by thermal decomposition, i.e. having a non-negligible coke content. This is not the case with the sizing agents normally used for refractory fibers such as polyvinyl acetates, polyvinyl alcohols, or epoxies having a zero or negligible coke content. Moreover, it has in some cases been necessary to remove the sizing agent prior to forming the interphase: such an operation is obviated in the process according to the invention.

Different types of sizing agents may be used for carrying out the invention. Generally, the sizing agent is selected amongst polymers having long carbon chains, such as those used as precursors in the manufacture of carbon fibers. The coke content should be sufficient to leave behind a substantially continuous coating on the elementary fibers, after the thermal process. Preferably, the coke content should be not less than 20% (percentage weight of the carbon residue with respect to the weight of sizing agent). As a comparison, the coke contents of polyvinyl acetate or epoxy sizing agents normally used are 0% and 5,7% respectively after thermal processing at 900° C.

Candidate materials for the sizing agent include acrylic polymers and cellulose polymers having a coke content generally in the range of 20 to 60% by weight. Among the latter, carboxymethylcelluloses can be chosen, these already being used as a sizing agent.

The process according to the invention may also be used in the manufacture of sequenced-matrix composite materials following a procedure comprising the steps of making a fibrous preform by means of strands or threads made of refractory fibers coated with a sizing agent, and densifying the preform with a part-ceramic sequenced matrix, with a carbon interphase formed between the fibers and the matrix, and at least a second interphase formed between two ceramic phases of the matrix. In this case, according to the invention, the preform is made from refractory fibers coated with a sizing agent of the type that leaves behind a carbon residue upon thermal decomposition, and the threads or strands are coated, prior to forming the matrix, by a substance capable of yielding the material constituting the second interphase through a thermal treatment, thereby producing both the first interphase by decomposition of sizing agent, and the second interphase by a transformation of the substance coating the strands or threads.

The strands or threads may be coated with a product susceptible of leaving behind a carbon residue upon thermal decomposition, so as to form a second interphase that is also made of carbon.

As in the foregoing, when the matrix is at least partially formed by chemical vapor deposition, the thermal treatment that simultaneously yields the first and second interphases is advantageously conducted during temperature rise of the enclosure into which the preform is inserted for the chemical vapor deposition operation. The infiltration by the ceramic material forming the matrix then occurs, in particular within the residual pores of each strand or thread, so as to constitute a ceramic phase between the first and the second interphases.

When the matrix is at least partially formed by a liquid process, the impregnation of the preform by a matrix precursor is obtained after the thermal treatment that gives arise to the first and second interphases. In particular, this impregnation takes place within the residual pores of each strand or thread. Accordingly, there is formed a ceramic phase, between the first and second interphases, during a second thermal treatment through which the ceramic matrix material is obtained by transformation of the precursor.

There will now be given different examples explaining how the process according to the invention can be implemented. These examples are given as an indication only and do not limit the invention. Comparative examples are also given.

BRIEF DESCRIPTION OF THE DRAWING

The single appended FIGURE illustrates very schematically how two interphases are formed when the process according to the invention is applied to the manufacture of a composite material having a sequenced matrix.

DETAILED DESCRIPTION OF THE PREFERRED EMBODIMENTS

In all the examples that follow, the fibers used for the manufacture of the fibrous preform are silicon carbide fibers coated with a carboxymethylcellulose sizing agent whose coke content is 33% at 900° C.

EXAMPLE 1

A one-dimensional (1D) fibrous preform, made from silicon carbide fibers coated with a carboxymethylcellulose sizing agent, is manufactured by winding filamentary fibers around a tool serving to keep the fibers aligned along planar sections.

The preform is inserted inside a chemical vapor deposition furnace to be densified by a silicon carbide matrix. The chemical vapor deposition of silicon carbide within the fibrous preform is a well-known operation, described e.g. in document FR-A-2 401 888.

Prior to the gaseous phase injection in the furnace, the preform is raised to the temperature required for the deposition process, i.e. around 1,000° C. During this temperature raising phase, the preform is maintained in the furnace, where it is exposed to an inert atmosphere, e.g. a partial vacuum containing nitrogen. As a result, the sizing agent on the fibers undergo a pyrolysis prior to the start of the matrix formation, leaving a carbon residue on the fibers that is to serve as an interphase between the fibers and the matrix.

The densification of the preform is then started and continues until the residual porosity reaches a ratio of 10% by volume.

In a bending test conducted on the thus-obtained composite material (1D-SiC/SiC with a C interphase arising from the thermal decomposition of the sizing agent) the measured bending resistance yields a value $R_f = 950$ MPa.

COMPARATIVE EXAMPLE 1a

The procedure is the same as for example 1, except that fibers coated with a polyvinyl acetate having a 0% coke content used in place of the carboxymethylcellulose sizing agent. The sizing agent is totally eliminated during the temperature rise prior to the silicon carbide infiltration.

The resistance $R_f$ measured during a bending test is 750 MPa only, i.e. 20% less than in the previous example.

COMPARATIVE EXAMPLE 1b

The process is identical to that of example 1a, except that an interphase is formed by vapor phase infiltration of laminar pyrolytic carbon, prior to forming the matrix, as in the process described in document FR-A-2 567 874 already mentioned. The sizing agent is totally eliminated during the temperature rise prior to the formation of the pyrocarbon interphase.

The bending resistance $R_f$ measured during a bending test yields a value of 1,000 MPa.

The process according to the invention therefore grants a bending resistance which is very close to that obtained by chemical vapor deposition of a pyrolytic carbon interphase, without making such an operation necessary.

EXAMPLE 2

A two-dimensional (2D) fibrous preform made from silicon carbide fibers coated with a carboxymethylcellulose sizing agent is produced by the following steps:
  piling flat plies of SiC fiber cloth of the type sold under the trade-name "Nicalon" by Nippon Carbon of Japan, and
  holding the pile of plies in an adapted tool to maintain a fiber volume ratio of around 40%.

The preform is placed inside a chemical vapor deposition furnace to be densified by the silicon carbide matrix. The densification is achieved as in example 1, the sizing agent undergoing pyrolysis during the temperature rise preceding the silicon carbide infiltration.

A tractive test is conducted on the final composite, during which are measured: the tensile breaking strain $\sigma_R$, the Young's modulus E, and the tensile breaking strain $\epsilon_R$. The results obtained are as follows:
  $\sigma_R = 170$ MPa
  $E = 210$ GPa
  $\epsilon_R = 0.35\%$

COMPARATIVE EXAMPLE 2a

The process is identical to that of example 2 except that the fibers are coated with a polyvinyl acetate sizing agent having a 0% coke content, in place of the carboxymethylcellulose sizing agent. The sizing agent is totally eliminated during the temperature rise preceding the silicon carbide infiltration.

A tractive test is conducted under the same conditions as in example 2, giving the following results:
  $\sigma_R = 140$ MPa
  $E = 230$ GPa
  $\epsilon_R = 0.12\%$

COMPARATIVE EXAMPLE 2b

The process is identical to that of example 2a, except that the interphase is produced by vapor phase infiltration of laminar pyrolytic carbon, prior to forming the matrix, as in the process described in document FR-A-2 567 874 mentioned above. The sizing agent is totally eliminated during the temperature rise prior to the formation of the pyrolytic carbon interphase.

A tractive test conducted under the same conditions as in example 2 gives the following results:
  $\sigma_R = 170$ MPa
  $E = 210$ GPa
  $\epsilon_R = 0.3\%$ As before, it is observed that the process according to the invention makes it possible to obtain composite materials with the sought-after mechanical properties (high resistance and high breaking strain) to a degree comparable to that obtained by chemical vapor deposition of a pyrolytic carbon interphase, without requiring such an expensive operation.

EXAMPLE 3

This example relates to the manufacture of a material having a sequenced matrix, and more particularly to a material in which the matrix comprises at least two ceramic phases separated by an interphase made from a material having a higher breaking strain than the material forming the ceramic phases. Such a material is described in the French patent application filed as FR-89 02718.

A 2D fibrous preform is produced from a cloth made of SiC fibers coated with a carboxymethylcellulose sizing agent and impregnated with a substance capable of leaving behind, after thermal decomposition, the desired material for forming an interphase between the two ceramic phases of the matrix. This material being e.g. carbon, the impregnating product is chosen among polymers having a non-negligible coke content. Typically, the impregnating product can be chosen among those polymers usable as a sizing agent according to the present invention. In the present example, the preform is impregnated with carboxymethylcellulose, i.e. the same substance as the one constituting the sizing agent for the fibers.

The impregnation conditions are chosen in such a way that the impregnating product covers each strand or thread of the preform, without infiltrating inside these strands or threads, which are each formed from a multitude of elementary fibers. This is achieved by carrying out the impregnation under atmospheric pressure, e.g. by a simple dipping operation, using an impregnating product having a sufficiently high viscosity.

The impregnated plies of the cloth are piled flat and held in place by an adapted tool to maintain a volume percentage of fibers of around 40%.

The thus-obtained preform is placed inside a chemical vapor deposition furnace to be densified by a silicon carbide matrix using the same process as described with reference to example 1.

During the temperature rise prior to the start of infiltration, the fiber's sizing agent, as well as the impregnating product of the preform, both undergo a pyrolysis, leaving behind a carbon residue.

As shoen in the annexed drawing, there is then formed a first carbon interphase 11 around the elementary fibers 10, and a second carbon interphase 16 exhibiting a few discontinuities, around each strand of the fibers 15 that constitute a thread of the preform (in the FIGURE, only a few elementary fibers are shown, whereas a thread is normally formed from a large number of such fibers). The above results from the fact that the impregnating product covers each thread, but does not penetrate within them.

Next, during the formation of the matrix, the silicon carbide is infiltrated within the accessible pores of the preform, including within the threads or strands 15. There is then formed a ceramic phase 12 between the carbon interphases 11 and 16, and a ceramic phase 18 separated from phase 12 by interphase 16.

A tractive test is conducted on the thus-obtained sequenced matrix composite material. The measurement of the tensile strength $\sigma_R$, Young's modulus E and breaking strain $\epsilon_R$ yield the following results:
  $\sigma_R = 210$ MPa
  $E = 230$ GPa
  $\epsilon_R = 0.7\%$ These results show a significant improvement in the tractive behavior compared with the results given in example 2 and comparative example 2b.

Example 3 shows how it is possible to simply obtain a sequence comprising a first carbon interphase on the fibers, a first ceramic phase, a second carbon interphase and a second ceramic phase. The sequencing of the matrix can of course be continued by further alternating the formation of an interphase and a ceramic phase, the interphases being obtainable by impregnation-pyrolysis or by chemical vapor deposition.

It is obviously possible to produce a sequenced matrix composite material by forming an interphase between the fibers and the matrix using the process according to the invention, and then by forming the different successive phases of the matrix as described in patent application FR 89 02718 already mentioned.

It is economically advantageous to perform the thermal treatment yielding the interphase between the fibers and the matrix, and possibly a second interphase, during the temperature rise prior to the infiltration of the ceramic matrix. However, this thermal treatment may also be obtained independently, and not in association with the densification process. The treatment is in this case conducted in an inert atmosphere (e.g. vacuum or nitrogen).

In the foregoing examples, the ceramic matrix is formed by a gaseous process (chemical vapor deposition). The process according to the invention is equally applicable in the case where the ceramic matrix is formed by a liquid process, i.e. by impregnation of the preform by means of a liquid precursor of the ceramic matrix material, followed by a thermal treatment yielding the ceramic material by a ceramic inducing transformation of the precursor. The methods for obtaining a ceramic matrix by a liquid process are well known.

In the above case, the impregnation by the precursor can be achieved on the preform with the fibers already coated with the sizing agent. Accordingly a single thermal treatment will yield both the interphase between the fibers and the matrix, by decomposition of the sizing agent, and the ceramic material of the matrix, by transformation of the precursor. The densification of the preform can then be continued by a liquid or a gaseous process, or even by alternating the deposition processes to obtain a sequenced matrix.

The impregnation by the precursor can also be achieved on the preform after forming the fiber-matrix interphase by a first initial thermal treatment that is applied independently. This will be the case especially when the carbon-fiber matrix interphase and a second carbon interphase are first produced, as explained in example 3. The impregnation by the matrix precursor is then carried out so that the precursor penetrates within each thread or strand of the fibers forming the preform. Accordingly, after a second thermal process transforming the precursor into a ceramic, there are obtained two ceramic phases separated by a second carbon interphase. The densification can then be continued by a liquid and/or gaseous process, possibly with a sequencing of the matrix.

We claim:

1. A process for the manufacture of a thermostructural composite material having a fibrous preform densified by a refractory matrix with a carbon interphase being provided between the fibers of the preform and the matrix, said process comprising the steps of:

providing elementary refractory fibers substantially coated with a sizing agent, said sizing agent being a material capable of leaving a carbon residue to form an interphase layer upon thermal decomposition;

forming a fibrous preform from said coated elementary refractory fibers formed into threads;

providing the carbon interphase layer as a substantially continuous coating on the elementary refractory fibers in the preform by thermal decomposition of the sizing agent upon heating of the fibrous preform; and subsequently densifying said fibrous preform with a refractory matrix material.

2. The process of claim 1, wherein the densifying step comprises:

placing the fibrous preform in an enclosure;

heating the fibrous preform; and forming at least part of the matrix by a chemical vapor deposition carried out on the heated fibrous preform in the enclosure, the thermal decomposition of the sizing agent to form the carbon interphase on the fibers being achieved upon heating of the fibrous preform in the enclosure prior to the forming of the matrix.

3. The process of claim 1, wherein the densifying step comprises:

impregnating the fibrous preform with a liquid precursor of the matrix material capable of being transformed into the matrix material by thermal treatment; and heating the impregnated fibrous preform to obtain both the carbon interphase by thermal decomposition of the sizing agent and the matrix material by transformation of its precursor.

4. The process of claim 1, wherein the sizing agent comprises phenolic resins, acrylic resins, or cellulose resins.

5. The process of claim 4, wherein the sizing agent contains carboxymethylcellulose resin.

6. A process for the manufacture of a thermostructural composite material having a fibrous preform densified by a part-ceramic sequenced matrix, with a first carbon interphase being provided between the fibers of the preform and the matrix, and with a second interphase being provided between two ceramic phases of the matrix, the process comprising the steps of:

providing elementary refractory fibers substantially coated with a sizing agent capable of leaving a carbon residue to form the first carbon interphase upon thermal decomposition;

fabricating a fibrous preform from strands or threads made of said coated elementary refractory fibers;

impregnating the fibrous preform with a precursor of the material of the second interphase capable of being transformed into the second interphase material by thermal treatment, whereby each strand or thread of the preform is covered with said precursor;

heating the fibrous preform to obtain the first carbon interphase as a substantially continuous coating on said elementary fibers by thermal decomposition of the sizing agent and the second interphase by transformation of its precursor, each strand or thread showing a residual porosity; and subsequently densifying the fibrous preform with a ceramic matrix material to form a first ceramic phase between the first and second interphases by introduction of the ceramic matrix material into the residual porosity of the strands or threads, and a second ceramic phase separated from the first ceramic phase by the second interphase.

7. The process of claim 6, wherein the densifying step comprises:

placing the fibrous preform with the strands or threads coated with the precursor in an enclosure;

heating the fibrous preform; and forming at least part of the ceramic matrix by a chemical vapor deposition operation carried out on the heated fibrous preform in the enclosure, the thermal decomposition of the sizing agent to form the first carbon interphase on the fibers and the transformation of the precursor into the second interphase material being achieved upon heating of the fibrous preform in the enclosure prior to the forming of the matrix.

8. The process of the claim 6, wherein the densifying step is carried out after the heating step and comprises:

impregnating the fibrous preform having the first and second interphases with a liquid precursor of the matrix material capable of being transformed into the matrix material by thermal treatment, the impregnation being carried out within the fibrous preform, including within the residual porosity of the strands or threads, and transforming the precursor into the matrix material by a thermal treatment, whereby the first ceramic phase of the matrix is provided between the first and second interphases and the second ceramic phase of the matrix is provided, separated from the first ceramic phase by the second interphase.

9. The process of claim 6, wherein the sizing agent comprises phenolic resins, acrylic resins, or cellulose resins.

10. The process of claim 9, wherein the sizing agent contains a carboxymethylcellulose resin.

11. The process of claim 6, wherein the strands or threads are coated with a precursor capable of leaving a carbon residue upon thermal treatment.

12. The process of claim 11, wherein the strands or threads are coated with a resin comprising phenolic resins, acrylic resins, or cellulose resins.

13. The process of claim 12, wherein the strands or threads are coated with a carboxymethylcellulose resin.

14. A process for the manufacture of a thermostructural composite material having a fibrous preform densified by a refractory matrix with a carbon interphase being provided between the fibers of the preform and the matrix, said process comprising the steps of:

providing elementary refractory fibers;

coating said elementary fibers with a sizing agent, said sizing agent being a material capable of leaving a carbon residue to form a carbon interphase layer upon thermal decomposition;

forming a fibrous preform from said individually coated elementary refractory fibers formed into threads;

providing the carbon interphase layer as a substantially continuous coating on the elementary refractory fibers by thermal decomposition of the sizing agent upon heating of the fibrous preform; and subsequently densifying said fibrous preform with a refractory matrix material.

* * * * *